United States Patent Office 3,069,364
Patented Dec. 18, 1962

3,069,364
POLYOLEFIN SYNTHESIS
Gaetano F. D'Alelio, South Bend, Ind., assignor, by direct and mesne assignments, to Dal Mon Research Co., Cleveland, Ohio, a corporation of Delaware
No Drawing. Filed Nov. 4, 1957, Ser. No. 694,077
4 Claims. (Cl. 252—429)

The present invention is directed to polymerizing an olefin such as ethylene, propylene, butylene, stryene, butadiene, isoprene and the like in an inert solvent in the presence of a catalyst prepared by grinding under inert conditions a mixture consisting essentially of zirconium metal and $TiCl_2$.

It is known to prepare a catalyst for the polymerization of ethylene by ball milling together a mixture of Al and $TiCl_3$, followed by heating the result at 200° C. for 18 hours, thereby giving a product comprising essentially $TiCl_2$. This procedure is disclosed in French Patent 1,132,506 to Bayer (Example 9). This same patent also discloses ball milling all or part of the product obtained by heating Al powder and $TiCl_4$ at high temperatures to give a catalyst that will polymerize ethylene. (See Examples 6 and 11 of the patent.) The product that is ball-milled in Example 6 is said to be $TiCl_2$, Ti, and Al, possibly with some $TiCl_3$. The product that is ball-milled in Example 11 is apparently a mixture of Ti, Al, $TiCl_2$, $TiCl_3$, and $AlCl_3$. It is also known that a catalyst for the polymerization of ethylene may be prepared at high temperatures by heating mixtures of Al and $ZrCl_4$; or Ti and $ZrCl_4$; or $ZrCl_4$ and Na; and $ZrCl_3$, $TiCl_4$ and Al.

My invention differs from the Bayer technique in that I have discovered that the product obtained by grinding together Zr and $TiCl_2$ alone can be used directly as an olefin polymerization catalyst, without a heating step in the catalyst preparation.

The following examples illustrate without limiting the invention.

*Example 1*

Five grams of granulated Zr sponge and 3.6 grams $TiCl_2$ are ball-milled together under pure dry nitrogen for 48 hours in a conventional stainless steel ball mill of 4 ounce capacity, which was about ½ full of ½ inch stainless steel balls. Two grams of the resulting catalyst are suspended in 50 ml. toluene in a 200 ml. stainless steel rocking autoclave. The transfer from the mill to the autoclave is made in a dry box under a slight pressure of nitrogen to avoid contamination with moisture and oxygen. (The catalyst is pyrophoric and is extremely sensitive to such contaminants, and therefore should be handled at all times under inert conditions.) After the catalyst is transferred to the autoclave, the autoclave is sealed and pressured with ethylene to about 500 p.s.i., and heated at a temperature of about 130° C. for 24 hours. The autoclave is represented with ethylene from time to time to maintain the pressure at about 500 p.s.i. After the run is completed, the autoclave is cooled, vented, opened, and the crude polyethylene product recovered. The yield is about 48 g. Substitution for the ethylene in Example 1 by propylene, butene-1, pentene-1, hexene-1, styrene, paramethylstyrene, vinyl cyclohexene and the like olefins containing a terminal $CH_2=CH-$ grouping produces the corresponding polymers whereas mixtures of such olefins produce copolymers. The catalysts of this invention may be used in conjunction with alkyl metals such as butyl-lithium, cyclohexyllithium etc., to produce cis polymers of isoprene.

The reaction product, if desired, may be purified by boiling in methanol containing hydrogen chloride, by techniques well-known to those skilled in the art.

The catalyst as above prepared is useful in polymerizing ethylene at temperatures ranging from about room temperature up to about 200° C., and even higher, and at pressures ranging from a few atmospheres, for example 50 p.s.i., to pressures as high as 10,000 p.s.i., and even higher. For practical operation, however, temperatures in the range of 50–200° C., and pressures of 200–1000 p.s.i. are suitable.

The polymerization reaction is suitably carried out in an inert solvent. Hydrocarbon solvents free from contaminants (especially free from oxygen and oxygen-containing compounds) are preferred. Among the suitable solvents are pentane, hexane, heptane, cyclohexane, octane, benzene, xylene, toluene, and the like.

The amount of activated catalyst is not critical. Relatively small amounts are operable to form relatively large amounts of polymer. In general, a practical range is 0.001 to 1 g. of catalyst per gram of ethylene polymerized. Even larger amounts are operable, but not necessary.

In conducting the ball milling operation it is often convenient to carry it out in the "wet" way. For example, a hydrocarbon may be added to the mixture to be ball milled, preferably one that will not interfere with the subsequent polymerization reaction. Solvents suitable for use in the polymerization reaction as above described are in general suitable for "wet" ball milling. The use of such a hydrocarbon in the ball-milling step provides a slurry of the catalyst in an inert medium which is easily handled. If the mixture is ground in the "dry" way, this should be done under an inert atmosphere such as pure dry nitrogen or a noble gas. The resultant milled mixture is extremely pyrophoric and should be handled under an inert atmosphere. If desired the milling can be carried out under an inert atmosphere of nitrogen or the like, and then the milled mixture can be flushed from the mill with an inert hydrocarbon. Similarly, the milling can be carried out partly in an inert atmosphere and then an inert hydrocarbon can be added to the mill toward the end of the milling in order to slurry the product for ease of handling.

Any grinding or milling whatever of a mixture consisting essentially of Zr and $TiCl_2$ will provide a catalyst of some activity. Preferably, however, the milling or grinding should be conducted for at least several hours, and suitably for at least several days. The $Zr:TiCl_2$ weight ratio can vary considerably, e.g., over the range of 1 Zr:100 $TiCl_2$ to 100 Zr:1 $TiCl_2$.

The polymerization reaction can be carried out for residence times in the range of 2–48 hours. Generally, the reaction will be found to be substantially complete within 10–24 hours.

The polyolefins and the polyethylene obtained by practice of this invention can be used in any conventional manner now being used by polyolefins formed by prior art procedures. Such uses include film, molding, pipe, tubing, filament, extruded articles and the like.

I claim:

1. The method of preparing a catalyst suitable for the polymerization of olefins which comprises the step of grinding for at least about 48 hours at room temperature and at ambient temperatures a mixture consisting essentially of Zr metal with TiCl$_2$ under inert conditions, said TiCl$_2$ starting material being initially substantially ineffective for polymerizing olefins to solid polymers.

2. The method according to claim 1 in which the mixture is ground in an inert hydrocarbon.

3. The method according to claim 1 in which the mixture is ground under nitrogen.

4. The method of preparing a pyrophoric catalyst suitable for the polymerization of olefins which comprises the step of ball milling for at least about 48 hours at room temperature and at ambient temperatures a mixture consisting essentially of Zr metal with TiCl$_2$ under inert conditions, said TiCl$_2$ starting material being initially substantially ineffective for polymerizing olefins to solid polymers.

References Cited in the file of this patent

UNITED STATES PATENTS

| | | |
|---|---|---|
| 2,893,984 | Seelbach et al. | July 7, 1959 |
| 2,899,416 | Schreyer | Aug. 11, 1959 |
| 2,905,645 | Anderson | Sept. 22, 1959 |

FOREIGN PATENTS

| | | |
|---|---|---|
| 526,101 | Italy | May 14, 1955 |
| 538,782 | Belgium | Dec. 6, 1955 |
| 1,132,506 | France | Nov. 5, 1956 |
| 1,134,740 | France | Dec. 3, 1956 |

UNITED STATES PATENT OFFICE

CERTIFICATE OF CORRECTION

Patent No. 3,069,364            December 18, 1962

Gaetano F. D'Alelio

It is hereby certified that error appears in the above numbered patent requiring correction and that the said Letters Patent should read as corrected below.

Column 1, line 55, for "represented" read -- repressured --

Signed and sealed this 11th day of June 1963.

(SEAL)
Attest:

ERNEST W. SWIDER
Attesting Officer

DAVID L. LADD
Commissioner of Patents